United States Patent
Gullikson et al.

(10) Patent No.: US 9,243,968 B2
(45) Date of Patent: Jan. 26, 2016

(54) METHOD FOR MEASURING PRESSURES IN A HIGH PRESSURE CELL BY MONITORING CONTINUOUS CHANGES IN PHYSICAL PROPERTIES OF GEO$_2$-SIO$_2$ SOLID SOLUTION

(71) Applicant: DIAMOND INNOVATIONS, INC., Worthington, OH (US)

(72) Inventors: Amber Leigh Gullikson, Mesa, AZ (US); Kurt Dylan Leinenweber, Chandler, AZ (US); Emil Tinkov Stoyanov, Dublin, OH (US); Abds-Sami Malik, Westerville, OH (US)

(73) Assignee: Diamond Innovations, Inc., Worthington, OH (US)

( * ) Notice: Subject to any disclaimer, the term of this patent is extended or adjusted under 35 U.S.C. 154(b) by 453 days.

(21) Appl. No.: 13/836,976

(22) Filed: Mar. 15, 2013

(65) Prior Publication Data
US 2014/0151604 A1    Jun. 5, 2014

Related U.S. Application Data

(60) Provisional application No. 61/718,380, filed on Oct. 25, 2012.

(51) Int. Cl.
*G01L 1/02* (2006.01)
*G01L 11/00* (2006.01)

(52) U.S. Cl.
CPC ........................ *G01L 11/00* (2013.01)

(58) Field of Classification Search
USPC ................................. 73/31.04, 700
See application file for complete search history.

(56) References Cited

U.S. PATENT DOCUMENTS

2012/0326347 A1* 12/2012 Rose et al. .......... B29C 35/0288
264/40.1

OTHER PUBLICATIONS

Introduction to high-pressure science, Przemyslaw Dera, 2010 (See attachment).*
In situ high pressure and high temperature Raman studies of (1−x)SiO2xGeO2 glasses, R Le Parc, Published Aug. 21, 2009 (See attachment).*
High-Pressure Investigation in the System SiO2—Ge02: Mutual Solubility of Si and Ge in Quartz, Coesite and Rutile Phases, Amber L. Gullikson, 2014 (See attachment).*

* cited by examiner

Primary Examiner — Hezron E Williams
Assistant Examiner — Xin Zhong

(57) ABSTRACT

A method for the measurement of pressure in high temperature and high pressure processes includes the steps of providing at least a first material compound and at least a second material compound. The at least first and second compounds are mixed to form a material sample. The material sample is loaded into a device and the device and material sample are subjected to a high pressure of up to about 10 GPa and a high temperature of up to about 2000° C. to form the material sample into a solid crystalline solution. The material sample is recovered for analysis and the composition of the crystalline solid solution is measured to determine the pressure ex situ.

16 Claims, 13 Drawing Sheets

METHOD FOR MEASURING PRESSURES IN A HIGH PRESSURE CELL BY MONITORING CONTINUOUS CHANGES IN PHYSICAL PROPERTIES OF $GeO_2$-$SiO_2$ SOLID SOLUTION

CROSS-REFERENCE TO RELATED PATENT APPLICATIONS

This application is related to and claims the benefit of U.S. Provisional Patent Application Ser. No. 61/718,380, filed Oct. 25, 2012.

TECHNICAL FIELD AND INDUSTRIAL APPLICABILITY

The present disclosure relates to a method for measuring high pressure and high temperatures up to about 10 GPa and about 2000° C., and more particularly, to the accurate measurement of these pressures at the temperatures attained during industrial processes.

SUMMARY

In one embodiment a method for the measurement of pressure in high temperature and high pressure processes includes the steps of providing at least a first material compound and at least a second material compound. The at least first and second compounds are mixed to form a material sample. The material sample is loaded into a device and the device and material sample are subjected to a high pressure of up to about 10 GPa and a high temperature of up to about 2000° C. to form the material sample into a solid crystalline solution. The material sample is recovered for analysis and the composition of the crystalline solid solution is measured to determine the pressure ex situ.

In another embodiment a method for the measurement of pressure in high temperature and high pressure processes includes the steps of providing at least a first material compound and at least a second material compound. The at least first and second compounds are mixed to form a material sample. The material sample is loaded into a device and the device and material sample are subjected to a high pressure of up to about 20 GPa and a high temperature of up to about 2000° C. to form the material sample into a solid crystalline solution. The material sample is recovered for analysis and the composition of the crystalline solid solution is measured to determine the pressure ex situ.

In yet another exemplary embodiment, a silica-germania solid solution comprises silica in a range up to 40 mol % of the solid solution; and germania in a range up to 60 mol % of the solid solution, wherein the silica-germania has a tetragonal structure.

These and other objects, features, aspects, and advantages will become more apparent from the following detailed description of the preferred embodiment relative to the accompanied drawings, in which:

DETAILED DESCRIPTION

Figure 1:
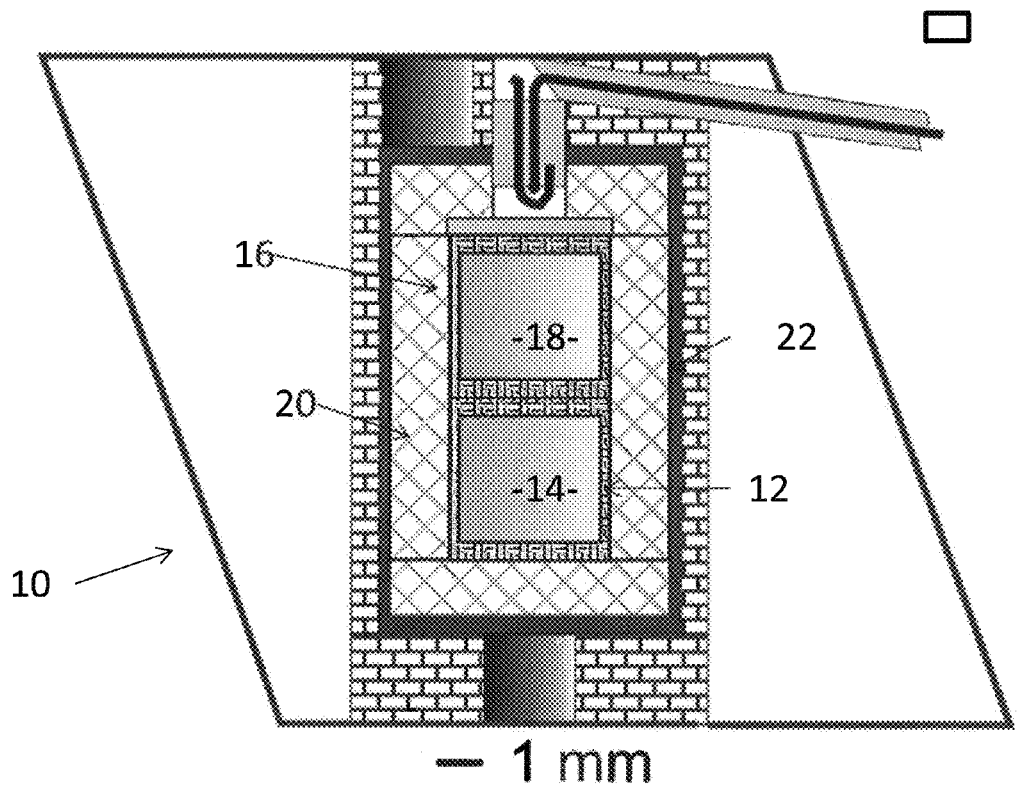
FIG. 1 is a cross-sectional view of a known multi-anvil cell assembly used for the experiments of the present invention.

Industrial scale high pressure and temperature (HPHT) processes employ pressures ranging up to approximately 10 GPa and temperatures ranging up to approximately 2200° C. These extreme pressure and temperature environments are obtained in specially designed cells in hydraulic presses. Such temperature and pressure conditions are necessary to manufacture, for example, diamond and/or cubic boron nitride.

Conventional HPHT apparatus which may be of the belt- or die-type as described in U.S. Pat. Nos. 2,947,611; 2,941,241; 2,941,248; 3,609,818; 3,767,371; 4,289,503; 4,673,414; and 4,954,139; each of which is incorporated herein in its entirety; or of a multi-anvil type as described in: Kawai, N. et al, "The Generation of Ultrahigh Hydrostatic Pressures by a Split Sphere Apparatus," Rev Sci Instrum 41, 1178 (1970); Stoyanov, E. et al, "Large-Volume Multianvil Cells Designed for Chemical Synthesis at High Pressures," High Pres Res 30, 175 (2010); and Walker, D. et al, "Some Simplifications to Multianvil Devices for High Pressure Experiments," Am Mineral 75, 1020 (1990).

However, it will be appreciated that the method of the present invention will find applicability in any HPHT apparatus which is capable of providing the required HP and HT conditions simultaneously. Accordingly, it is intended that such other HPHT apparatuses are within the scope of the invention herein described.

It is desirable to measure accurately and continuously, the temperatures and pressures attained in such industrial high pressure equipment. While it is possible and feasible to continuously and accurately measure the internal temperature, with, for example, a thermocouple; it is not possible, at present, to continuously and accurately measure the pressure.

Pressure measurement techniques that are currently available include monitoring the resistivity changes of Bi, Tl, Cs, or Ba. But this is discontinuous and is only possible when pressure is applied without heating. Another technique employs phase changes at high temperature and pressure, such as that between quartz and coesite or that between coesite and stishovite, but this is also discontinuous and requires multiple experiments per point to attain accuracy.

Still another technique is to monitor the X-ray diffraction lines of NaCl, KCl, or CsCl when under compression and at high temperatures. This technique provides continuous and accurate measurements over the pressure and temperature ranges desired, but requires specific and costly equipment at a synchrotron beam line, which is typically only available at a national laboratory. Accordingly, this technique would not be practical for industrial use.

It has been found that when a mixture of silicone dioxide ($SiO_2$) and germanium dioxide ($GeO_2$) is subjected to pressures ranging up to about 10 GPa and temperatures up to about 1500° C., a solid solution, in which Si inserts into $GeO_2$, begins to form. This solid solution crystallizes in a tetragonal (rutile) structure and the amount of Si in the $GeO_2$ depends directly on the pressure. This material, although formed at high pressure, can be recovered and is stable at room pressure. The amount of Si in the solid solution can be measured directly by, for example, electron microprobe analysis. Indirect quantification of Si in solid solution can be made by X-ray diffraction because, as the amount of Si in $GeO_2$ increases, the crystal lattice parameter contracts. Indirect quantification of Si can also be done by $^{29}Si$-NMR (Nuclear Magnetic Resonance) because the Si in $GeO_2$ is present in octahedral coordination as opposed to tetrahedral coordination in $SiO_2$. It should be appreciated that the disclosed method contemplates pressures ranging up to about 20 GPa and temperatures up to about 2000° C.

The present invention discloses a technique for continuous measurement of pressures up to 20 GPa ex situ, which is useful, for example, in monitoring internal cell pressures in industrial high pressure processes. This technique allows for quotidian measurement of cell pressure, at industrially relevant pressures and temperatures, using widely available analytical tools. The measurement technique relies on the formation of a solid solution of Si in $GeO_2$, which occurs at temperatures 1200° C. and varies continuously with pressure. This solid solution is recoverable at ambient conditions and the amount Si in solid solution can be detected by, for example, electron microprobe, X-ray diffraction, or $^{29}Si$-NMR. The sample is recovered as a sintered chunk by peeling off the platinum or other metal foil (in the case of metal capsules) or dissolving the surrounding NaCl in water (in the case of salt capsules). For electron microprobe, the sintered sample is polished and carbon-coated. For powder x-ray diffraction the sintered chunk is ground in an agate mortar. For NMR the chunk can be used "as is" or ground to a powder.

The present invention discloses different experimental procedures. In a HPHT procedure, high purity (≥99%) $SiO_2$ and $GeO_2$ powders were mixed together in a 50:50 mole percent ratio. The powder was then loaded into a high pressure cell and subjected to high pressure up to 10 GPa and temperatures up to 1500° C. and held at constant pressure and temperature for a time period ranging from minutes to hours. The cell was allowed to cool rapidly (>1000° C./minute) prior to pressure release to recover the material for analysis.

In some cases, fixed point standards were also loaded concurrently and were used to measure the pressure at three known points. These were $CaGeO_3$ (pre-made from the end member components) which gave the garnet-perovskite fixed point, and $SiO_2$, which gave the quartz-coesite and coesite-stishovite fixed points. In addition distilled $H_2O$ may be added to the $SiO_2$ to enhance reaction kinetics.

After recovery, the sample and standard capsules (if present) were both cut in half on the vertical axis. One half of both were mounted in epoxy for electron probe microanalysis. The other half was used for powder x-ray diffraction.

The starting $SiO_2$ and $GeO_2$ can be crystalline or amorphous. In the latter case, it is preferable for the $SiO_2$ and $GeO_2$ to be combined as a glass (employing standard glass making techniques) prior to high pressure treatment. A mixture of $SiO_2$ and $GeO_2$ may also be derived from sol-gel techniques by reacting alkoxides of Si and Ge.

An X-ray diffraction analysis (XRD) procedure was performed in Bragg-Brentano geometry using Cu Kα radiation generated at 40 keV and 30 mA on a Siemens D5000 diffractometer, or generated at 40 keV and 40 mA on a Bruker D8 diffractometer using a zero background holder made from single crystal quartz (obtained from The Gem Dugout company, State College, Pa.). The samples were mixed with silicon standard (NIST#640c from The Gem Dugout) in order to more accurately determine the cell parameters of the phases present. The cell parameters, accurate to $10^{-3}$ Å, were determined with a combination of peak-fitting procedures on the Jade™ software package and/or Rietveld refinement on the GSAS software package.

An experimental procedure incorporating electron μ-probe analysis was done on a CAMECA SX100 instrument operated at 15 kV and 20 nA, using focused beam. Only spectrometer 1 and 4 were used during the analysis, both using TAP (Thallium acid pthalite, one of the types of crystals typically used in probe spectrometers for wavelength dispersive analysis) analyzing crystals. Two elements were calibrated in order to quantify the chemical composition of each phase present in the samples. A quartz standard was used to calibrate Si, and germanium metal was used to calibrate Ge. Elemental concentrations were produced by the microprobe, and through stoichiometry, the amount of oxygen and the wt % of oxides were calculated.

Figure 2:
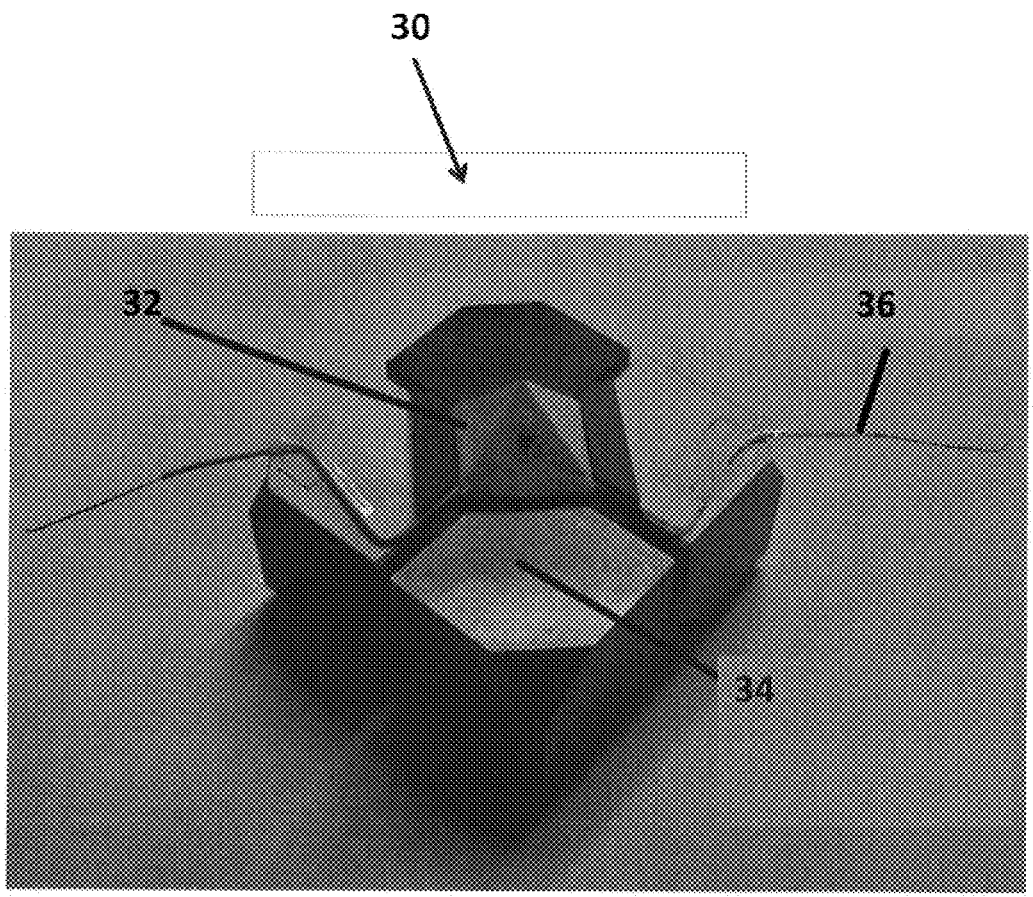
FIG. 2 is a perspective view of a known octahedral high pressure cell used between 3 and 10 GPa in the experiments of the present invention.
Figure 3:
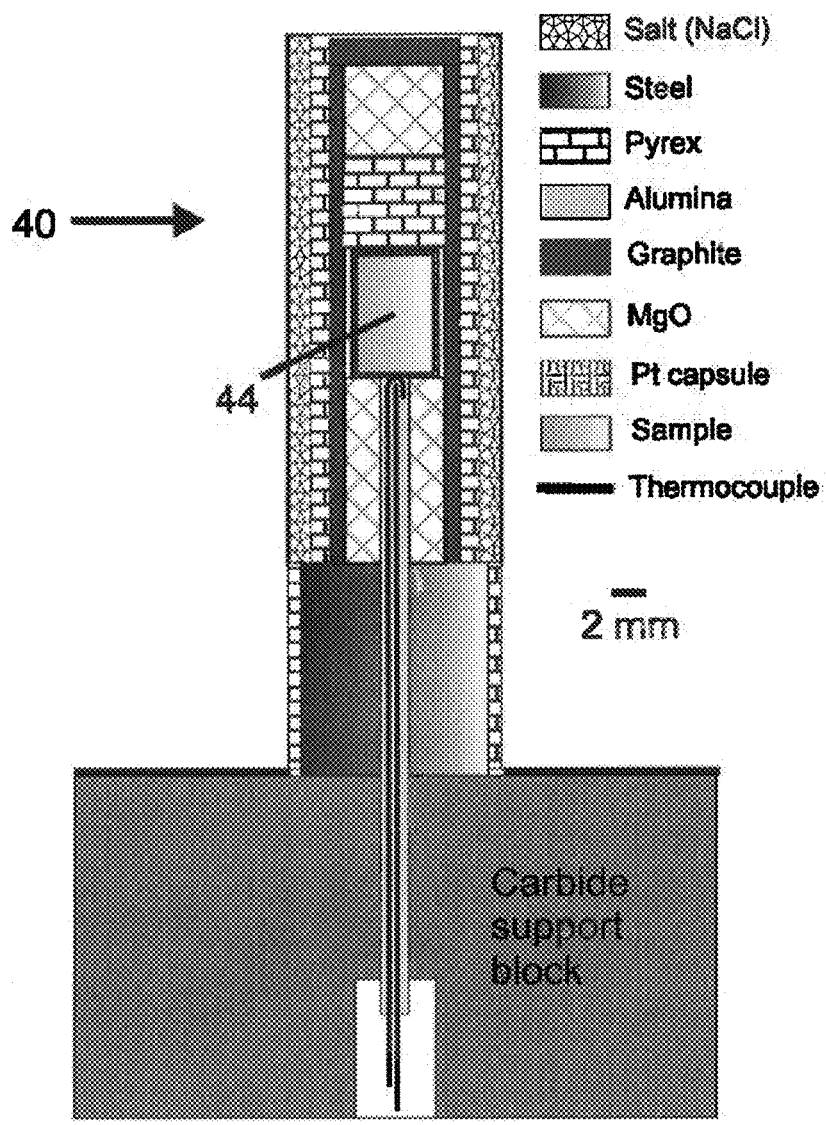
FIG. 3 is a cross-sectional view of a known 19 mm piston cylinder assembly used for the experiments of the present invention.

Referring to FIGS. 1-3, various assembly devices can be used to practice the methodology of the present invention. As shown in FIG. 1, a multi-anvil cell assembly 10 includes a sample capsule 12 that receives a material sample 14, for example, $SiO_2$ and $GeO_2$ powder. A standard capsule 16 receives a standard material 18, as will be described further herein. The sample and standard are enclosed in separate, chemically sealed platinum capsules 12, 16. Capsules 12, 16 are encased in sleeves 20. Sleeves 20 can be made of MgO or other appropriate material. Sleeves 20 are in turn surrounded by a furnace 22, made of, for example, graphite. Thermal insulation 24, such as zirconia ($ZrO_2$), surrounds sleeve 20.

As shown in FIG. 2, an octahedral pressure medium, high pressure cell 30 of the present invention can be used between 3 and 10 GPa. The octahedron can be 18 mm on an edge, however it should be appreciated that the present invention contemplates a variety of sizes. Pyrophylite gaskets and paper backing are also used. The assembly is surrounded by eight tungsten carbide cubes 34 truncated to 12 mm on a corner, with the thermocouple taken out through the gaps between the carbide cubes. FIG. 2 shows the octahedral pressure medium resting on four of the eight cubes; the other four cubes (not shown) are placed over the top of the octahedron, so the pressure is applied to all 8 faces of the octahedron.

Forces are applied on the octahedron in all eight directions through the eight cubes in the "6-8" geometry. See Kawai et al. Details of the assembly are given in Stoyanov et al. As shown in FIG. 3, a known piston cylinder assembly 40 can also be used for the experiments of the present invention. FIG. 3 shows a piston cylinder assembly, for example, 19 mm as described by Moore G, et al, "A Low-Pressure, High-Temperature Technique for the Piston-Cylinder," Am Mineral 93, 48 (2008), in a non-end loaded piston cylinder, used for the experiments below 3 GPa.

Figure 4:
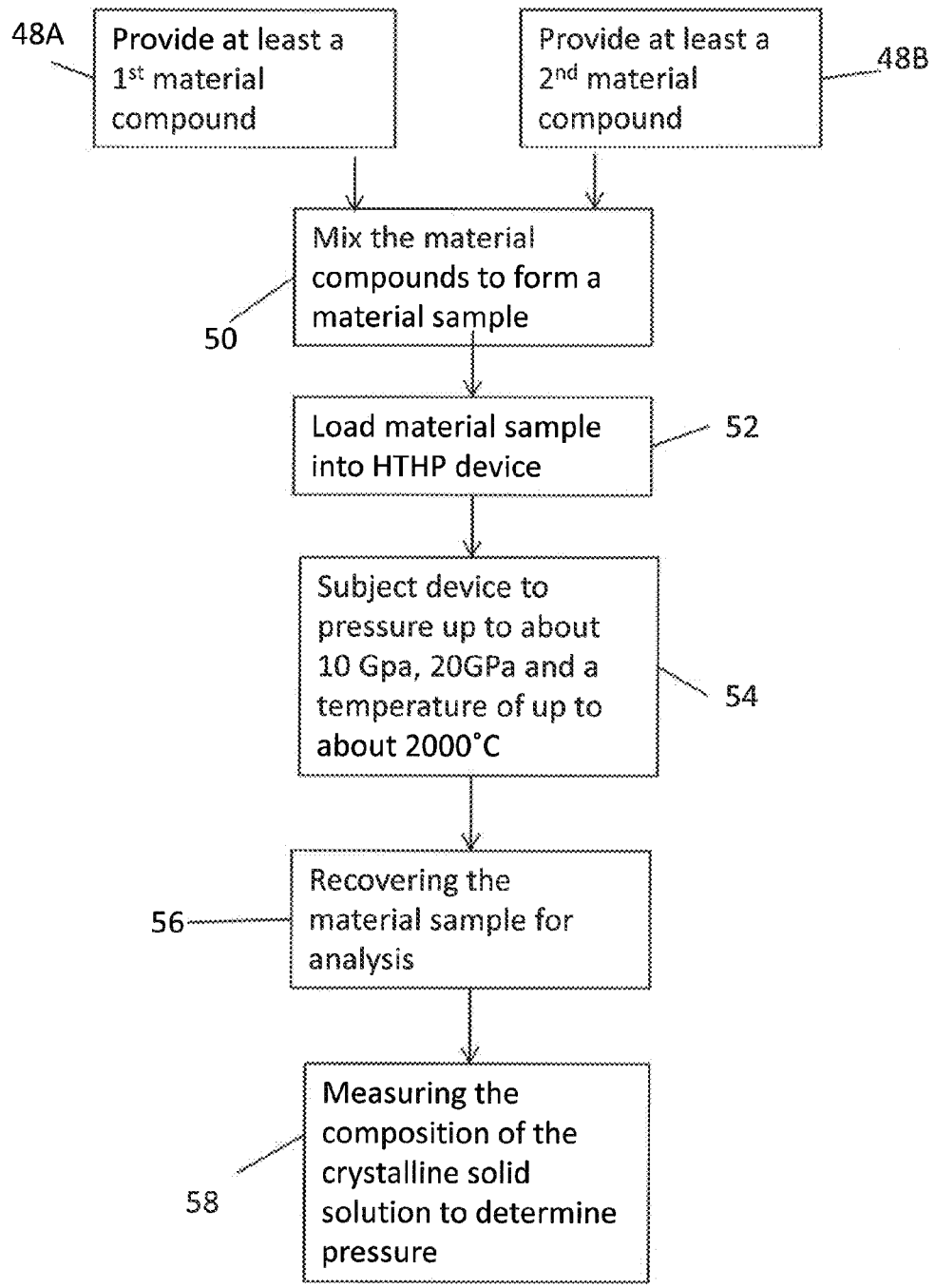
FIG. 4 is a flow diagram of the methodology of the present invention.

Referring to FIG. 4, the method of the present invention includes the steps of providing a material sample. Referring to steps 48A and 48B at least a first and second material compound is provided. It should be appreciated that a plurality of material compounds can be provided. The material compounds can be different. For example, as will be described further in detail by the following examples, a first material compound can be a $SiO_2$ powder and the second material compound can be a $GeO_2$ powder. The material sample can also be $TiO_2$ and $SiO_2$. The specific embodiments and tables below should be referred to for additional information.

In step 50 the material compounds are mixed together to form a material sample. As set forth fully by the specific examples and tables below, the powders can be ground and dried. Referring to step 52, the material sample is then loaded into a capsule of the high pressure, high temperature device described above. A fixed point standard is also loaded into the device as described in the specific examples below.

As shown in step 54 the device, as described above with reference to FIGS. 1-3, is subjected to pressures up to 10 GPa and temperatures of up to about 2000° C. It should be appreciated that the device can be pressurized up to about 20 GPa. The pressure and temperature can be held constant for a pre-determined time as set forth below.

During step 54 the material sample is formed into a solid crystalline solution. For purposes herein a solid crystalline solution is defined as a solution of a crystalline phase that can have variable composition. See West, Anthony R, *Solid State Chemistry and its Applications*, John Wiley & Sons Ltd., 1984: 358-359.

Figure 5:
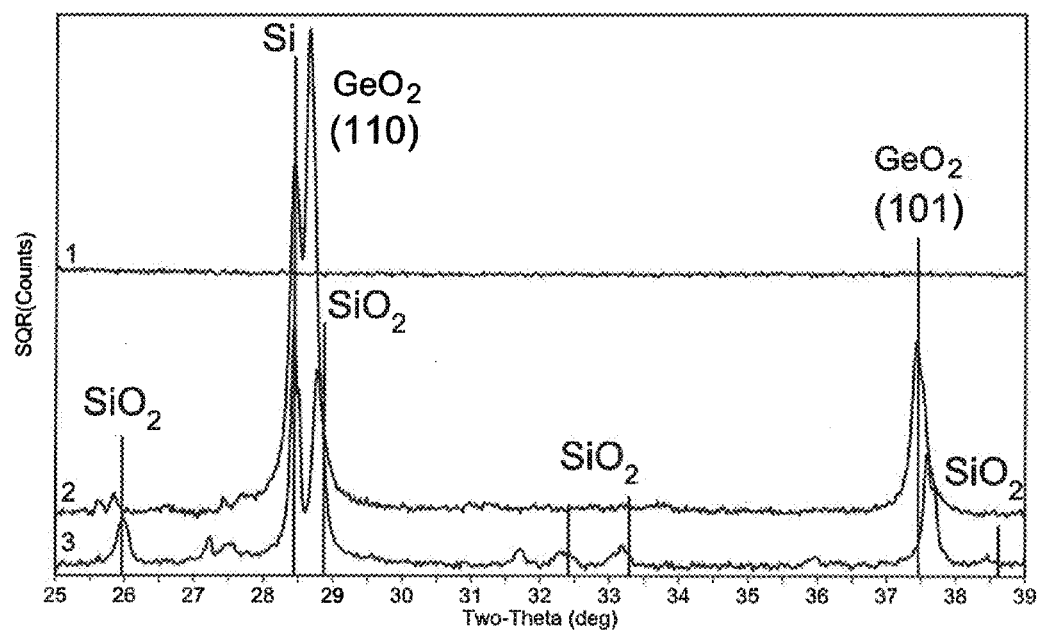
FIG. 5 are representative XRD patterns for (1) $SiO_2$/$GeO_2$ glass, (2) $GeO_2$ in the rutile structure type (argutite), and (3) $SiO_2$/$GeO_2$ after high pressure and temperature treatment.

As shown in FIG. 5, each compound of the material sample has a crystal lattice parameter. For example, the XRD pattern number 2 in FIG. 5 shows the characteristic peaks (which are labeled) for $GeO_2$, which arises from its unique crystal lattice parameter. In this case, the $GeO_2$ has crystallized in the rutile structure type. $GeO_2$ typically crystallizes in this structure when it is subjected to HPHT conditions and its mineral name is 'argutite'. Also in XRD pattern number 2, there is a peak corresponding to Si. This arises from a standard Si powder that was intentionally added to serve as a reference point.

XRD pattern number 1 in FIG. 5 is that of the $SiO_2/GeO_2$ glass before being subjected to HPHT conditions. This pattern does not show any peaks because the glass is amorphous and does not possess a crystal structure and thus has not crystal lattice parameters. For purposes herein a crystal lattice parameter is defined as a unit cell structure of lengths of the base vectors (of the unit cell) and the angles between them together forming the lattice parameters (or lattice constants). See, Muller U., *Inorganic Structural Chemistry*, John Wiley & Sons Ltd., 1991: 8-9.

During the formation of the solid crystalline solution the crystal lattice parameters will change. For example, the Si enters and changes the crystal lattice parameter of the $GeO_2$. In FIG. 5, XRD pattern number 3 is that of the $SiO_2/GeO_2$ glass after being subjected to HPHT conditions. The material is no longer an amorphous glass and the XRD pattern shows peaks, which are labeled for $SiO_2$ or $GeO_2$. As before, the peak labeled 'Si' is from Si powder that was added, as a reference standard, to the material after recovering it from the HPHT cell.

It can be seen that, in XRD pattern number 3, the peak labeled $GeO_2$ (101) has shifted relative to where it was in XRD pattern number 2. The shift in peak position is measured relative to the Si reference standard. The Si peak has not shifted, but the $GeO_2$ (101) peak has shifted. Similar events occur with other material compounds, i.e., $SiO_2$ and $TiO_2$.

The material sample is then recovered for analysis in step 56. The fixed point standard is also recovered. During the measuring step 58, the concentration of the first material in the second material is measured. Likewise, the concentration of the second material compound in the first material can be measured. As set forth fully in the examples and tables below, the amount of Si in the solid crystalline solution can be measured directly by electron microprobe analysis.

Figure 6:
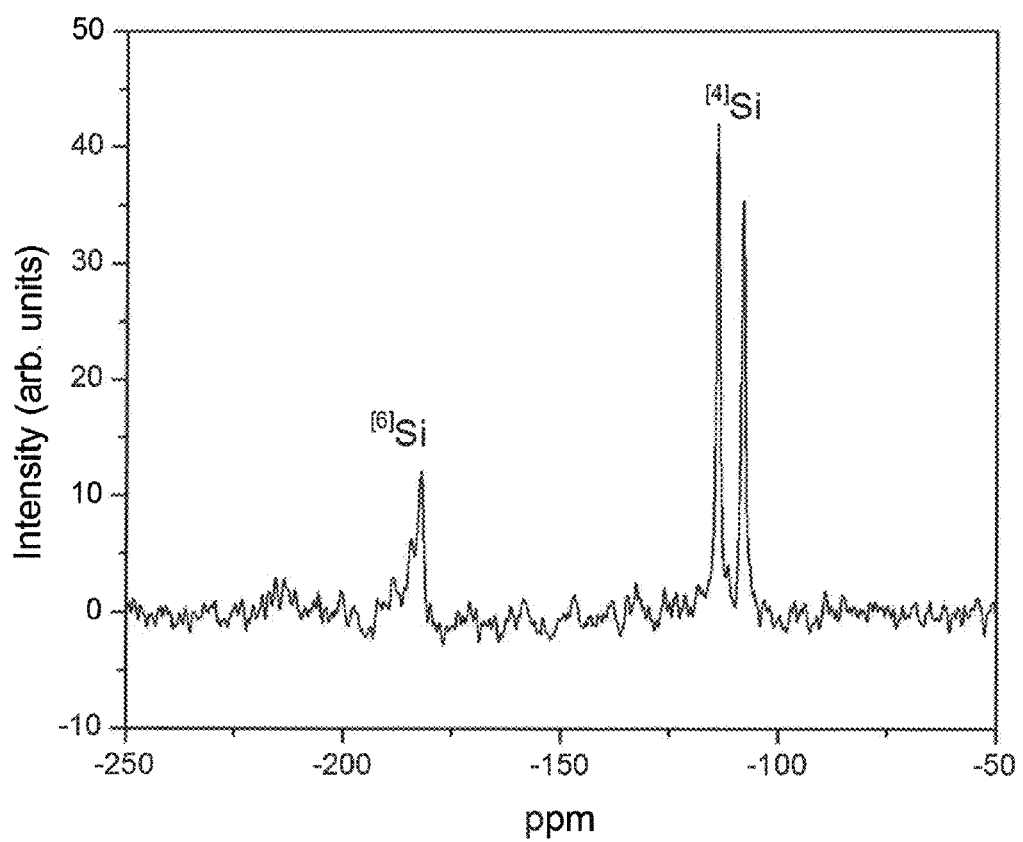
FIG. 6 is a plot of the solid state $^{29}Si$ NMR data for $SiO_2$/$GeO_2$ after high pressure and temperature treatment.

The amount of Si in the solid crystalline solution can be measured indirectly by X-ray diffraction, wherein, as described above, as the amount of Si in the $GeO_2$ powder increases, the crystal lattice parameter continuously changes, leading to a shift in the position of the $GeO_2$ (101) peak. Further, the amount of Si in the solid crystalline solution can be measured indirectly by nuclear magnetic resonance (NMR), wherein the $^{29}Si$ nucleus is detected to be present in $GeO_2$ in either octahedral or tetrahedral coordination. FIG. 6 shows the NMR data of a representative sample in which the peaks at ~110 ppm arise from Si in tetrahedral coordination whereas the peaks at ~175 ppm arise from Si in octahedral coordination. The NMR data and XRD data are complementary in that NMR gives information about the local environment and the XRD yields information about the long range structure.

Accordingly, the solid crystalline solution can be used as a pressure gauge. Moreover, the crystal lattice parameter of the solid crystalline solution can be used as a pressure gauge.

Experimental results using specific embodiments are explained below and listed in Table 1.

TABLE 1

| Sample | $SiO_2$—$GeO_2$ (mg) | $TiO_2$—$SiO_2$ (mg) | $SiO_2$ (mg) | $CaGeO_3$ (mg) | Pressure (kBar) | Temp. (° C.) | Time (min) |
|---|---|---|---|---|---|---|---|
| 1 | 32.27 | 27.58 | — | — | 80 | 1500 | 60 |
| 2 | *137.68 | — | — | — | 5 | 1000 | 120 |
| 3 | 29.40 | 24.10 | ~2 | — | 100 | 1500 | 60 |
| 4 | 31.89 | 25.5 | ~2 | — | 38 | 1500 | 60 |
| 5 | 29.20 | — | 16.86 | — | 47 | 1500 | 60 |
| 6 | 37.67 | — | — | 22.78 | 60 | 1500 | 60 |
| 7 | 34.26 | — | ~20.64 | — | 40 | 1500 | 60 |
| 8 | 28.94 | — | — | 21.94 | 60 | 1400 | 60 |
| 9 | 29.88 | — | — | 20.00 | 60 | 1200 | 120 |
| 10 | 36.55 | — | — | — | 23 | 1200 | 120 |
| 11 | 39.40 | — | — | — | 15 | 1200 | 120 |
| 12 | 31.99 | — | — | 19.06 | 65 | 1200 | 120 |
| 13 | 25.29 | — | — | 20.98 | 62.5 | 1200 | 120 |
| 14 | 32.08 | — | — | — | 10 | 1200 | 120 |

TABLE 1-continued

| Sample | SiO$_2$—GeO$_2$ (mg) | TiO$_2$—SiO$_2$ (mg) | SiO$_2$ (mg) | CaGeO$_3$ (mg) | Pressure (kBar) | Temp. (° C.) | Time (min) |
|---|---|---|---|---|---|---|---|
| 15 | 28.04 | — | ~23.23 | — | 31 | 1200 | 120 |
| 16 | 36.02 | — | ~20.53 | — | 92 | 1200 | 120 |
| 17 | 28.93 | — | ^18.19 | — | 95 | 1200 | 120 |
| 18 | 24.84 | — | ^14.45 | — | 101 | 1200 | 120 |
| 19 | 15.84 | — | ~20.55 | — | 45 | 1200 | 120 |

*Only germanium oxide used.
~NaAlSi$_3$O$_8$ used.
^With H$_2$O addition.

In the first embodiment (Sample 1) 32.27 mg of an equimolar mixture of high-purity SiO$_2$ powder (Alfa/Aesar 99.999%, stock #10856, Alfa Aesar, Ward Hill, Mass.) and GeO$_2$ powder (Alfa/Aesar 99.98%, stock #A16709) were ground twice to dryness under ethanol using an agate pestle and mortar before drying in a 110° C. drying oven in air. A platinum cup (14—FIG. 1) of diameter 3.5 mm and length of 3.6 mm with a wall thickness of 125 microns was charged with this powder and welded shut with a platinum lid using a Laserstar 1900 Series Laser Welding Workstation (Laserstar Technologies, Riverside, R.I.) to form a chemical seal. A second identical platinum capsule (16—FIG. 1), but containing a TiO$_2$—SiO$_2$ mixture was also made. Both capsules were loaded into the assembly of FIG. 1 and then compressed in the multi-anvil press at 1500° C. for 60 min. The sample was quenched non-isobarically and recovered.

In a second embodiment (Sample 2), 137.68 mg of Germanium (IV) oxide, 99.98% (Alfa/Aesar), was placed in 5 mm diameter by 7.81 mm high platinum (Pt) capsule. This capsule was loaded into the assembly 30 of FIG. 2 and compressed for 120 minutes at 1000° C. and 500 MPa then quenched isobarically and recovered.

In a third embodiment (Sample 3) a 3.5 mm diameter by 3.13 mm high Pt capsule (44—FIG. 3) was charged with 29.40 mg of a SiO$_2$—GeO$_2$ mixture and a 3.5 mm diameter by 2.79 mm high Pt capsule was charged with 24.10 mg of a TiO$_2$—SiO$_2$ mixture, as described above. A third Pt capsule, 2 mm high and welded shut, contained SiO$_2$ powder, used as a standard for detecting the Coesite-Stishovite phase change. These three capsules were loaded in a high pressure cell 30 as shown in FIG. 1. FIG. 1 shows the normal assembly with two capsules; the third, very small capsule was embedded just below the thermocouple in this embodiment. The SiO$_2$ containing capsule was located nearest to the thermocouple to ensure accurate temperature and pressure. The high pressure experiment was done as described with Sample 1 above.

Sample 4 also consisted of three capsules. 31.89 mg of SiO$_2$—GeO$_2$, 25.5 mg of TiO$_2$—SiO$_2$, and SiO$_2$ standard were loaded in a high pressure cell and pressed as in Sample 1. The pressing parameters were chosen in order to detect the onset of the quartz-Coesite phase change.

Sample 5 consisted of two capsules. 29.20 mg of SiO$_2$—GeO$_2$ and 16.86 mg of SiO$_2$ standard were loaded in a high pressure cell and pressed as described in Sample 1. The pressing parameters were chosen to detect the upper limit of the quartz-Coesite phase boundary.

In Sample 6, two capsules, one containing 37.67 mg of SiO$_2$—GeO$_2$ and another containing 22.78 mg of CaGeO$_3$ standard, were loaded and pressed as described in Sample 1. The pressing parameters were chosen to detect the garnet-perovskite phase boundary.

In Sample 7, two capsules, one containing 34.26 mg SiO$_2$—GeO$_2$ and another containing 20.64 mg of NaAlSi$_3$O$_8$ were loaded and pressed as described in Sample 1. At the pressing parameters chosen, the NaAlSi$_3$O$_8$ melted, producing a glass and leading to pressure loss within the cell. As a result, the SiO$_2$ in the SiO$_2$—GeO$_2$ sample also melted, leaving only GeO$_2$-rutile crystals and SiO$_2$ glass in the product.

In Sample 8 two capsules, one containing 28.94 mg SiO$_2$—GeO$_2$ and another containing 21.94 mg CaGeO$_3$ were loaded and pressed at 1400° C. as described in Sample 1. The pressing conditions were chosen to detect the garnet-perovskite phase boundary and its temperature sensitivity.

In Sample 9, 29.88 mg SiO$_2$—GeO$_2$ and 20.0 mg CaGeO$_3$ were loaded as described in Sample 1. Pressing was at 1200° C. for 2 hours. Pressure was chosen to detect the lower boundary of the CaGeO$_3$ garnet-perovskite phase transition.

In Sample 10, one capsule containing 36.55 mg SiO$_2$—GeO$_2$ sample was loaded as described previously. Pressing was done on a non-end loaded piston cylinder (Boyd and England, 1960) in order to access <3 GPa pressure. 2.3 GPa Cell assembly parts for this apparatus are described in Moore et al. Pressing conditions were chosen to determine the lowest pressure for Si insertion into the GeO$_2$-rutile structure. A pressing temperature of 1200° C. was held for 2 hours before being isobarically quenched.

In Sample 11, 39.4 mg of SiO$_2$—GeO$_2$ was loaded and pressed as described above in Sample 10. Pressing conditions were chosen to determine the lowest pressure for Si insertion into the GeO$_2$-rutile structure.

In Sample 12, 31.99 mg SiO$_2$—GeO$_2$ and 19.06 mg CaGeO$_3$ were loaded as described in Sample 1. Pressing was done as described in Sample 9. Pressing parameters were chosen in order to bracket the upper pressure boundary of the CaGeO$_3$ garnet-perovskite phase transition.

25.29 mg SiO$_2$—GeO$_2$ and 20.98 mg CaGeO$_3$ were loaded in Sample 13 as described above with sample 1. Pressing parameters were chosen to further refine the pressure bracket for the CaGeO$_3$ phase transition and pressing was done as described in Sample 9.

Sample 14 was loaded and pressed with 32.08 mg SiO$_2$—GeO$_2$ as described above with Sample 10. Pressing conditions were chosen to determine the lowest pressure for Si insertion into the GeO$_2$-rutile structure.

Sample 15 was loaded and pressed with 28.04 mg SiO$_2$—GeO$_2$ and 23.23 mg SiO$_2$ plus 0.53 mg H$_2$O as described above in Sample 9. H$_2$O was added to SiO$_2$ to increase the transformation kinetics for the quartz to coesite phase transition. Pressing conditions were chosen to bracket the lower pressure range of the quartz-coesite phase transition.

Sample 16 was loaded and pressed with 36.02 mg SiO$_2$—GeO$_2$ and 20.53 mg SiO$_2$ plus 0.6 mg H$_2$O as described in paragraph [0053]. Pressing conditions were chosen to bracket the lower pressure range of the coesite-stishovite phase transition.

Sample 17, similar to Sample 9, was loaded and pressed with 28.93 mg SiO$_2$—GeO$_2$ and 18.19 mg SiO$_2$ plus 0.66 mg $H_2O$. Pressing parameters were chosen to bracket the upper pressure range of the coesite-stishovite phase transition.

Sample 18 was loaded with 24.84 mg $SiO_2$—$GeO_2$ and 14.45 mg $SiO_2$ plus 0.67 mg $H_2O$ and pressed as described in Sample 9. Pressing parameters were chosen to bracket the upper pressure range of the coesite-stishovite phase transition.

Sample 19 was loaded with 15.84 mg $SiO_2$—$GeO_2$ and 20.55 mg $SiO_2$ plus 0.74 mg $H_2O$ and pressed as described in Sample 9. Pressing parameters were chosen to bracket the upper pressure range of the quartz-coesite phase transition.

A second series of samples, listed in Table 2 below, were pressed on a belt-type apparatus. The first of these, Sample 20, 1.0701 g of an equimolar mixture of $SiO_2$ and $GeO_2$ powder, prepared as described in Sample 1, was loaded into a tantalum cup (14.6 mm diameter by 5.0 mm height and 0.14 mm wall thickness). A second tantalum cup (14.92 mm diameter by 7.0 mm height and 0.14 mm wall thickness) was placed over the first cup to enclose the sample. This assembly was loaded into a high pressure cell as shown in and pressed at 1480° C. for 44 m, then quenched non-isobarically to be recovered at room pressure.

Sample 21 was loaded as described in Sample 20 with 0.9870 g of $SiO_2$—$GeO_2$ mixture and pressed at 1480° C. for 30 m.

Sample 22 was loaded and pressed as described previously with 1.0578 g of $SiO_2$—$GeO_2$, however a silica glass container (12.03 mm OD, 8.5 mm ID, 13.0 mm overall height, and 11.0 mm hole depth) was used as the sample holder. A disc (12.03 mm diameter by 2.0 mm height) made of the same silica glass was used as the lid for the container.

In Sample 23, two salt containers (ID 7.62 mm, OD 39.95 mm, depth 6.35 mm, and overall height 9.52 mm) were used to encapsulate 0.9044 g of an equimolar mixture of $SiO_2$ and $GeO_2$ powder. High pressure and temperature sintering was done as described in Sample 20.

For Sample 24, a glass of equimolar composition $SiO_2$—$GeO_2$ obtained from SEM-COM Company (Toledo, Ohio) was ground to a powder in an agate mortar and pestle. 0.9646 g of this powdered glass was encapsulated in salt containers as described in Sample 23. The high pressure experiment was done as described in Sample 20.

In Sample 25, 0.9871 g of $SiO_2$—$GeO_2$ glass was loaded and pressed as described in Sample 24 with a soak time of 30 minutes.

In Sample 26, 0.9642 g of $SiO_2$—$GeO_2$ glass was loaded and pressed as described in Sample 24 with a soak time of 20 minutes.

In Sample 27, 0.9907 g of $SiO_2$—$GeO_2$ glass was loaded and pressed as described in Sample 24 with a soak time of 10 minutes.

TABLE 2

| Sample | $SiO_2$—$GeO_2$ (mg) | Pressure (kbar) | Temp. (° C.) | Time (min) |
|---|---|---|---|---|
| 20 | 1.0701 (oxides) | 65 | 1480 | 44 |
| 21 | 0.9870 (oxides) | 65 | 1480 | 30 |
| 22 | 1.0578 (oxides) | 65 | 1480 | 44 |
| 23 | 0.9044 (oxides) | 65 | 1480 | 44 |
| 24 | 0.9646 (glass) | 65 | 1480 | 44 |
| 25 | 0.9871 (glass) | 65 | 1480 | 30 |
| 26 | 0.9642 (glass) | 65 | 1480 | 20 |
| 27 | 0.9907 (glass) | 65 | 1480 | 10 |

Further to the above, $SiO_2$ is well known as the mineral quartz under ordinary conditions of formation (atmospheric pressure and temperatures to 870° C.). This mineral contains Si in tetrahedral coordination with oxygen. As pressure and temperature are applied simultaneously, $SiO_2$ transforms from quartz to coesite at a pressure near 3 GPa, See Bose, K. et al., "Quartz-coesite Transition Revisited: Reversed Experimental Determination at 500-1200° C. and Retrieved Thermochemical Properties," Am Mineral 80, 231 (1995). Coesite also contains Si in tetrahedral coordination. At the extreme pressure of 9 GPa, coesite transforms to stishovite, with all the silicon in octahedral coordination, see Zhang, J et al, "In Situ X-ray Observations of the Coesite Stishovite Transition: Reversed Phase Boundary and Kinetics," Phys Chem Miner 23, 1 (1996). $GeO_2$, unlike $SiO_2$, can exhibit either tetrahedral or octahedral coordination at atmospheric pressure. At high temperatures near its melting point, $GeO_2$ has a quartz-like structure, with Ge in tetrahedral coordination. At temperatures below 900° C. $GeO_2$ has a rutile-like structure, with Ge in octahedral coordination.

In the embodiments described above, all of the products obtained above 2 GPa in pressure were composed of two phases: a silicon-rich phase ($SiO_2$ as quartz, coesite, or stishovite depending upon the pressure) and a germanium-rich phase ($GeO_2$ as argutite). Silicon internal standard was used in the XRD analysis, in order to provide an internal reference against which to accurately measure the unit cell lattice parameters of all the phases.

The XRD measurements showed that the $GeO_2$ phase, with a rutile crystal structure, has lattice parameters that strongly depend on the synthesis pressure. At lower pressures, the lattice parameters were nearly identical to those of the JCPDS (Joint Committee on Powder Diffraction Standards) file for the $GeO_2$ phase (JCPDS card #035-0729). But as pressure increased, the lattice parameters steadily decreased. The rate of decrease was also dependent on pressure, with greater effects at higher pressures, until the minimum lattice parameters are reached at 8.7 GPa.

Figure 7A:
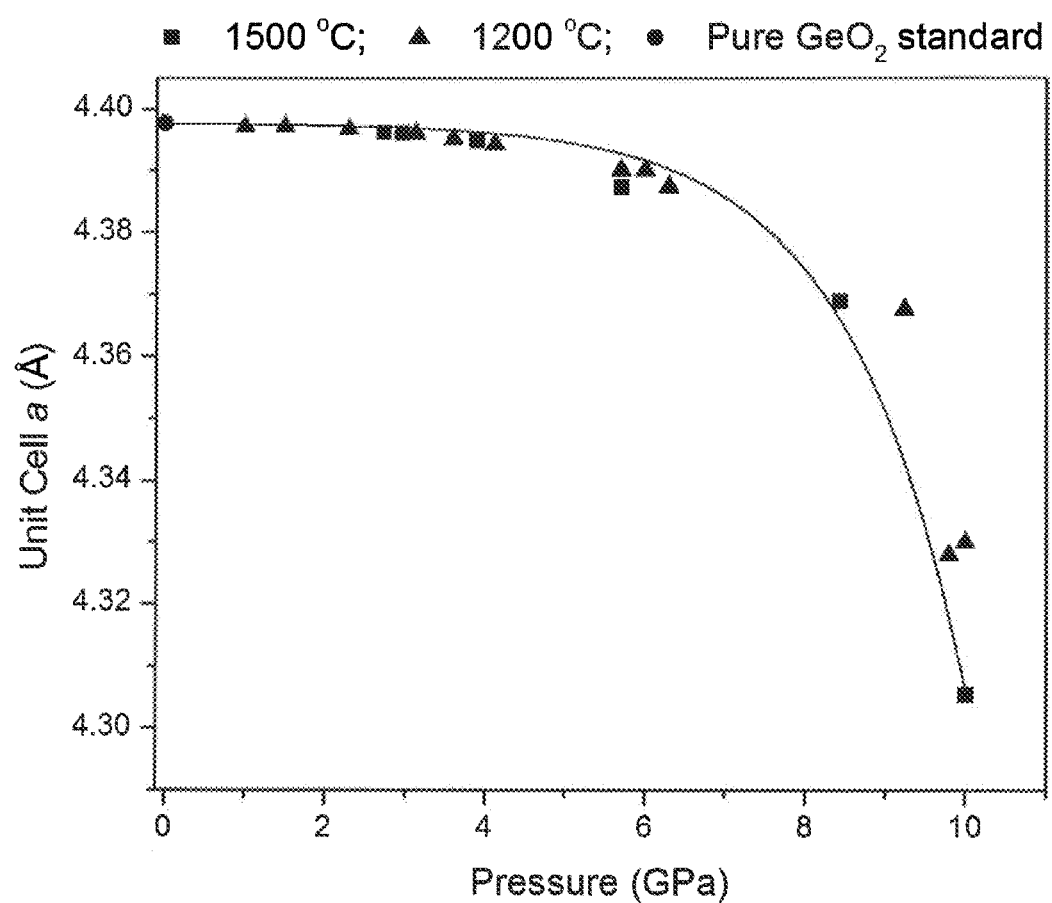
FIG. 7A is a graph of the lattice parameter "a" of the rutile phase of $GeO_2$—$SiO_2$ as a function of pressure.
Figure 7B:
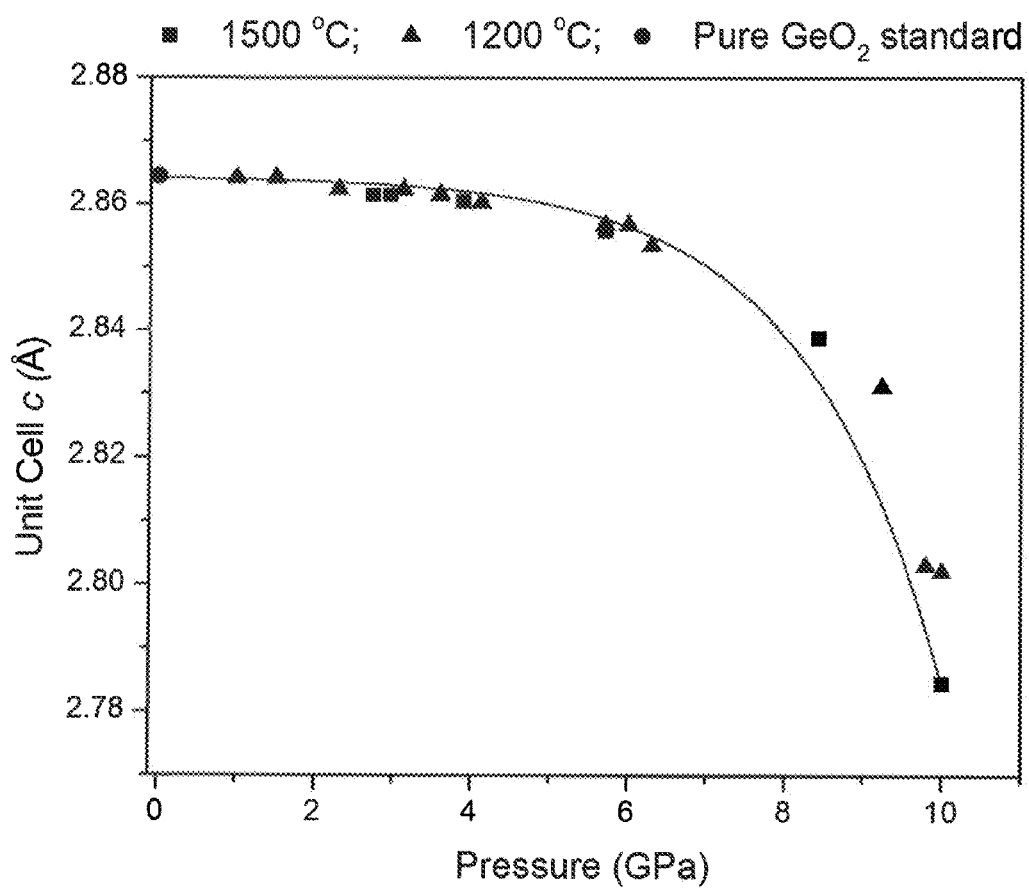
FIG. 7B is a graph of the lattice parameter "c" of the rutile phase of $GeO_2$—$SiO_2$ as a function of pressure.

The two lattice parameters of argutite are plotted as a function of synthesis pressure as shown in FIGS. 7A and 7B. FIG. 7A plots the lattice parameter "a" of the rutile phase of $GeO_2$—$SiO_2$ as a function of pressure, showing the variable lattice parameter due to pressure-dependent incorporation of Si into $GeO_2$. FIG. 7B is the same as FIG. 7A but shows the lattice parameter "c".

Not only do both lattice parameters decrease, but as a result every d-spacing in argutite also decreases with formation pressure. In practice this shows that the amount of shift can either be determined by least-squares fitting of the entire XRD pattern to obtain the two lattice parameters of argutite, or by fitting any single argutite peak in the XRD pattern, or any combination of argutite peaks. It should also be noted (and can be seen in FIG. 5) that the argutite peaks are sharp, and are very distinct from those of any $SiO_2$-rich phases and from the peaks of silicon, so the peaks can readily be fitted accurately.

The lattice parameter shifts are due to the incorporation of silica ($SiO_2$) into the rutile structure of argutite ($GeO_2$). In order to demonstrate this, electron probe microanalysis was performed on polished and carbon-coated samples that displayed the lattice parameter variations. The probe results unequivocally showed that $SiO_2$ and $GeO_2$ were mixed in the argutite phase in the form of a solid solution on the chemical join $SiO_2$—$GeO_2$. This provides direct evidence that the lattice parameter decreases are due to the smaller silicon atom substituting for the germanium atom in the rutile structure. The silica-germania rutile or tetragonal structure, there may be silica in a range up to 40 mol % of the solid solution and germania in a range up to 60 mol % of the solid solution.

Figure 8:
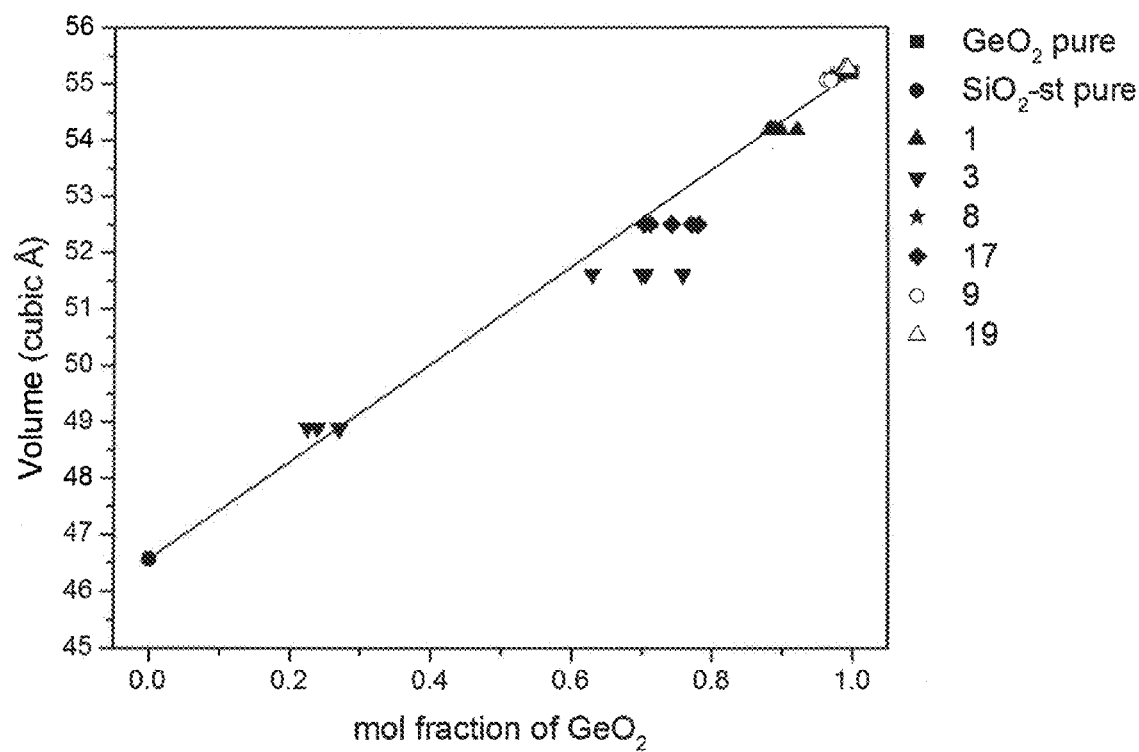
FIG. 8 is a graph of the variation of unit cell volume with the composition of the $GeO_2$—$SiO_2$ solid solution.

The probe compositions are plotted as a function of the cell volume for argutite in FIG. 8. Compositions of the solid solutions obtained using electron probe microanalysis (EPMA), showing the variation of lattice parameter with the composition of the $GeO_2$—$SiO_2$ solid solution. The numbers in the figure legend refer to the individual Embodiments described herein and listed in Table 1.

In a first approximation, it may be seen that the lattice volume changes linearly with the composition. This correlation is referred to in chemistry as Vegard's Law. Because the solid solution follows Vegard's Law fairly closely, the silica content of the argutite may be derived directly from the lattice parameters using a linear relationship between the volume of the end-member argutite ($GeO_2$) and the end-member stishovite ($SiO_2$) without requiring additional microprobe measurements for every single sample.

Because of the ease of accurate measurement of either the lattice parameters or d-spacings of the argutite, the XRD information on an unknown sample of $GeO_2$—$SiO_2$ can be used to calculate the pressure that the sample was derived from, assuming that we already know the temperature of its formation.

In order to make use of this, the pressure of formation of the "known" samples of $GeO_2$—$SiO_2$ must be accurately calibrated and the derived information used to provide a calibrated reference standard for pressure. This can be done by synthesizing samples of $GeO_2$—$SiO_2$ in a well-calibrated multi-anvil device. The prior calibration of the device can be used to determine the pressure dependence of the $SiO_2$—$GeO_2$ lattice parameters or d-spacings.

However, in order to make the calibrations more certain, it is desirable to include fixed-point reference standards in the experiments as well. This provides a series of known pressures that can be used to back up the prior calibration of the multi-anvil device, and give us certainty that our pressures are precise. This is important because any errors in the pressure will propagate into all of the subsequent measurements.

Figure 9:
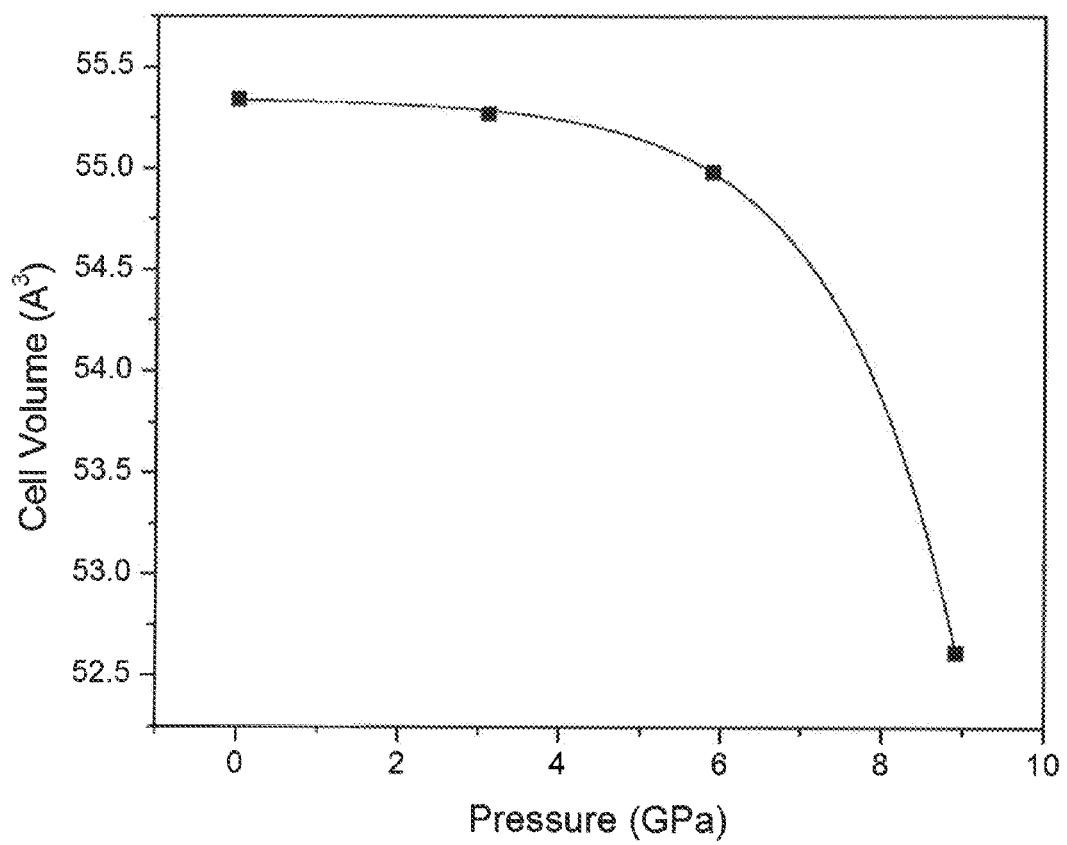
FIG. 9 is a graph of the variation of unit cell volume with pressure for 4 fixed-point pressure standards.

FIG. 9 plots the cell volume of the silica-saturated $GeO_2$—$SiO_2$ solid solution bracketed at precisely determined pressures using fixed-point pressure standards at 1200° C. First point: the zero-pressure reference point (single phase $GeO_2$); second point: the lattice parameter at the pressure of the quartz-coesite transition in $SiO_2$ (3.1 GPa); third point: the lattice parameter at the pressure of the garnet-perovskite transition in $CaGeO_3$ (5.9 GPa); fourth point: the lattice parameter at the pressure of the coesite to stishovite transition in $SiO_2$ (9.2 GPa). The lattice parameter shifts in the silica-bearing argutite at two temperatures of 1200° C. and 1500° C. were calibrated against the fixed-point transitions.

Another way to ensure accuracy in the lattice parameter shift measurement is to use a reference standard of single phase $GeO_2$ argutite. The $GeO_2$ available from Alfa-Aesar and other suppliers is a mixture of poorly crystalline argutite, along with a quartz-like form of $GeO_2$, and some $GeO_2$ glass. A well-crystallized and single phase $GeO_2$ argutite sample were synthesized in a piston-cylinder at 2 GPa and 1100° C. as a reference standard for the d-spacing of the silica-free material.

The lattice parameters of the silica-saturated argutite may be fitted to an equation as a function of pressure:

$$y = A_1 \times \exp\left(-\frac{x}{t_1}\right) + y_o.$$

Where y is the lattice parameter and x is the pressure and the constants are listed in Table 3. Either the "a" or "c" lattice parameter, shown in FIGS. 7A and 7B respectively can be used for fitting. Only the data for samples run at 1500° C. were used for fitting. For comparison, the curve fit using the fixed point standards (FIG. 9) is also given. It can be seen that the agreement between the standards and the a-lattice fit is quite good. So this equation can be used for pressure measurement.

TABLE 3

| | a lattice | | c lattice | | Standards | |
|---|---|---|---|---|---|---|
| | Value | Error | Value | Error | Value | Error |
| $y_o$ | 4.39773 | 0 | 2.8644 | 0 | 55.3424 | 0 |
| $A_1$ | −1.06E−4 | 5.68225E−5 | −2.50298E−4 | 1.45371E−4 | −0.00716 | 7.403E−4 |
| $t_1$ | 1.47867 | 0.11919 | −1.73303 | 0.17853 | −1.50138 | 0.02626 |

Figure 10:
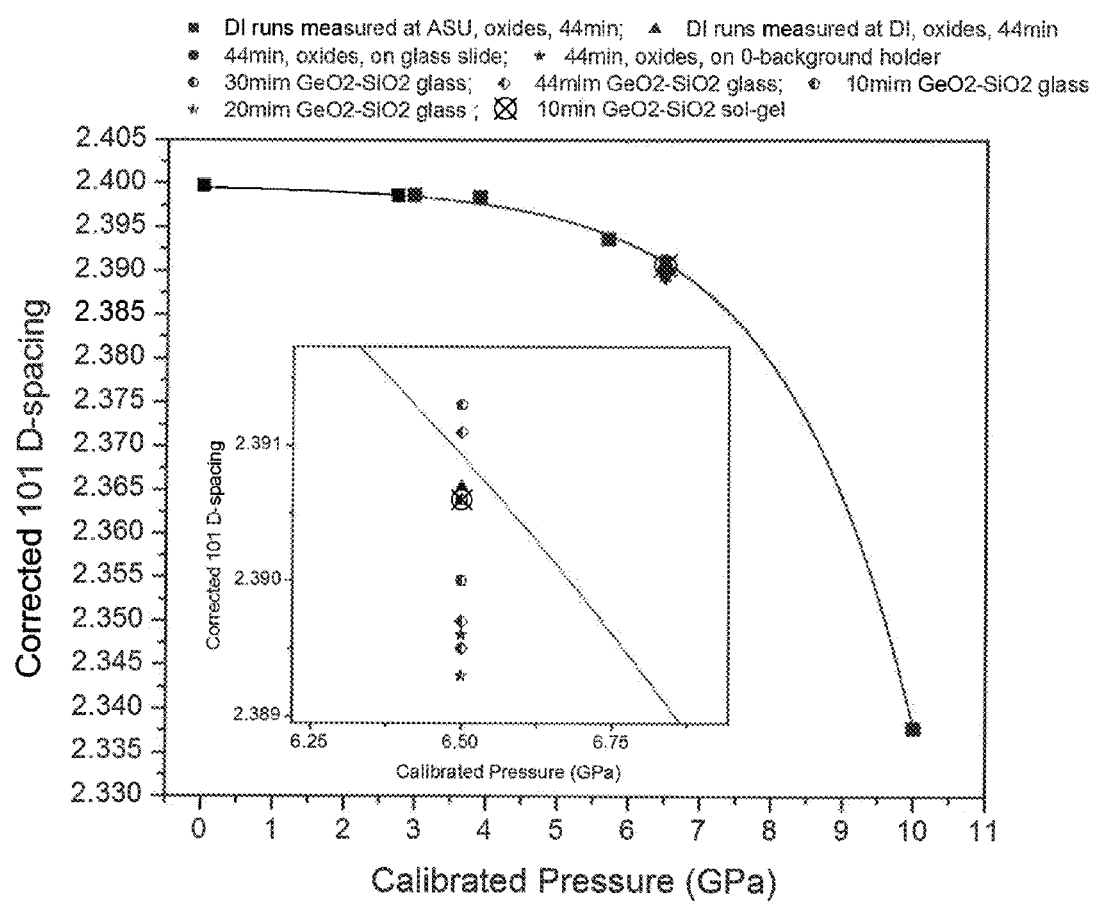
FIG. 10 is a graph of the variation of the d-spacing calculated from the $GeO_2$ (101) peak. The inset shows the scatter in the data for repeated measurements.

FIG. 10 (insert) plots samples that were pressed at 6.5 GPa pressure using different apparatus and measured done using different XRD instruments, in order to demonstrate repeatability and reproducibility of this pressure measurement technique. As can be seen in the plot, the scatter in the sample measurements is relatively small. Mixed oxide samples had to be held at pressure for ~45 minutes in order to reach equilibrium whereas a silica-germania glass could reach equilibrium within ~30 minutes. It also appears that a sol-gel derived glass could reach equilibrium in ~10 minutes.

Figure 11:
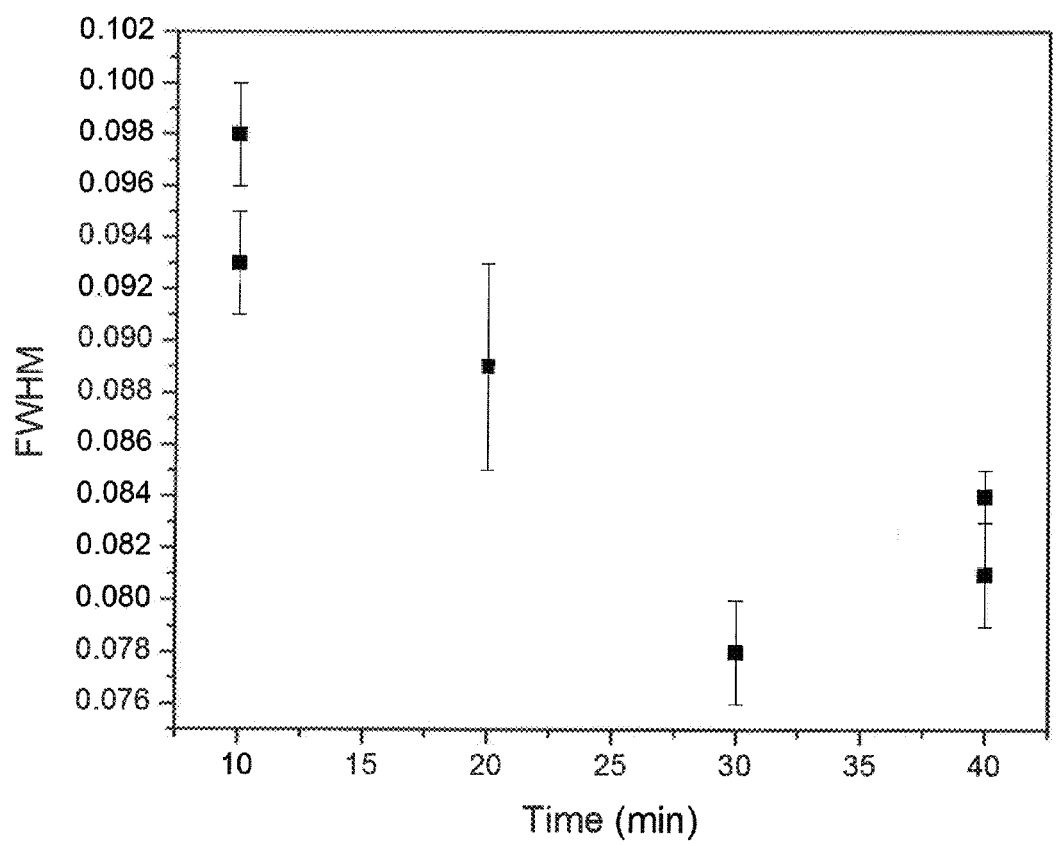
FIG. 11 is a plot of the full-width at half maximum (FWHM) of the XRD peaks for $SiO_2$/$GeO_2$ samples that were held at high pressure and temperature for different time periods.

The time at pressure and temperature to reach equilibrium is plotted in FIG. 11 for silica-germania glass. The measure of full-width at half maximum (FWHM) of the XRD peaks is used as an indication of the equilibration of the silica-germania sample at pressure. It is clear that for times <30 minutes, equilibration is not achieved. This means that for accurate measurement of internal cell pressure, the sample must be held for ~30 minutes when a silica-germania glass is used.

Figure 12:
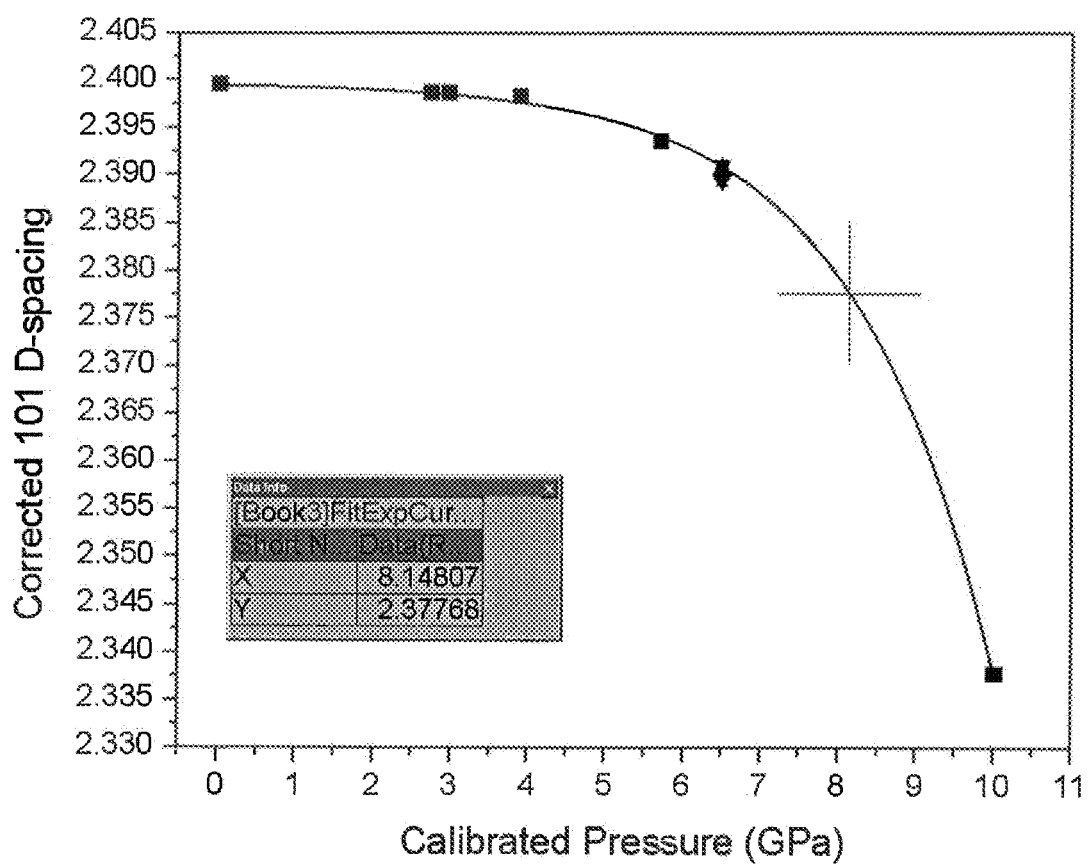
FIG. 12 is similar to FIG. 10, but shows how the calibration curve can be used for measuring the internal cell pressure. The cross marks the measured cell pressure.

FIG. 12 is an example of the use of the calibration curve to measure the internal cell pressure that was previously unknown. The high pressure cell was charged with silica-germania glass and pressed at ~1500° C. The resulting glass was analyzed by XRD and the result plotted on the calibration curve. In this case, it was found that the internal cell pressure was 8.1 GPa.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A method of measuring pressure in high temperature and high pressure processes comprising the steps of:
   providing a material sample;
   loading the material sample into a device;

subjecting the device and material sample to a high pressure of up to about 10 GPa and a high temperature of up to about 2000° C. to form the material sample into a solid crystalline solution;

recovering the material sample for analysis; and measuring the composition of the crystalline solid solution to determine the pressure ex situ, wherein the step of providing a material sample further comprises providing a quantity of $SiO_2$ powder, providing a quantity of $GeO_2$ powder, and mixing the $SiO_2$ and $GeO_2$ powders to form the material sample.

2. The method of claim 1, wherein pressure and temperature are held constant for a pre-determined time up to 120 minutes.

3. The method of claim 1, wherein the $SiO_2$ powder and the $GeO_2$ are either crystalline or amorphous.

4. The method of claim 1, further comprising combining the $SiO_2$ powder and the $GeO_2$ powder as a glass prior to high pressure treatment.

5. The method of claim 1, wherein the $SiO_2$ powder and the $GeO_2$ powder mixture is derived from sol-gel techniques by reacting alkoxides of Si and Ge.

6. The method of claim 1, wherein the step of measuring comprises measuring the amount of Si in the solid crystalline solution by electron microprobe analysis.

7. The method of claim 1, wherein the step of measuring comprises measuring the amount of Si in the solid crystalline solution by X-ray diffraction, wherein the amount of Si in the $GeO_2$ powder changes the crystal lattice parameters.

8. The method of claim 1, wherein the step of measuring comprises measuring the amount of Si in octahedral coordination and tetrahedral coordination in the solid crystalline solution by solid state nuclear magnetic resonance of $^{29}Si$, wherein the Si is present in solid solution with $GeO_2$.

9. The method of claim 1, further comprising the step of using the solid crystalline solution as a pressure gauge.

10. The method of claim 1, wherein the step of providing a material sample further comprises providing a quantity of $TiO_2$ to form the material sample.

11. A method of measuring pressure in high temperature and high pressure processes, comprising the steps of:

providing at least a first material compound;

providing at least a second material compound;

mixing the at least first and second compounds to form a material sample;

loading the material sample into a device;

subjecting the device and material sample to a high pressure of up to about 10 GPa and a high temperature of up to about 2000° C. to form the material sample into a solid crystalline solution;

recovering the material sample for analysis; and measuring the composition of the crystalline solid solution to determine the pressure ex situ, wherein the at least first material compound is $SiO_2$ powder and the at least second material compound is $GeO_2$ powder and the step of forming the material sample comprises mixing the $SiO_2$ and $GeO_2$ powders to form the material sample.

12. The method of claim 11, wherein pressure and temperature are held constant for a pre-determined time up to 120 minutes.

13. The method of claim 11, wherein the $SiO_2$ powder and the $GeO_2$ are either crystalline or amorphous.

14. The method of claim 11, further comprising the step of combining the $SiO_2$ powder and the $GeO_2$ powder as a glass prior to high pressure treatment.

15. The method of claim 11, wherein the $SiO_2$ powder and the $GeO_2$ powder mixture is derived from sol-gel techniques by reacting alkoxides of Si and Ge.

16. The method of claim 11, wherein the step of measuring comprises measuring the amount of Si in the solid crystalline solution by electron microprobe analysis, XRD, or NMR.

* * * * *